(12) United States Patent
Kingsbury et al.

(10) Patent No.: US 6,427,981 B1
(45) Date of Patent: Aug. 6, 2002

(54) SECONDARY LATCH FOR A TIRE CARRIER

(75) Inventors: Bruce Daniel Kingsbury, Lake Orion; Scott Matthew Markiewicz, Grand Blanc; Garrett J. Wize, Sterling Heights; Madhu Posani, Bloomfield Hills; Ramakrishna Putumbaka; Derek Lee Oxyer, both of Farmington Hills, all of MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 09/592,223

(22) Filed: Jun. 12, 2000

(51) Int. Cl.[7] ................................................ B66D 1/00
(52) U.S. Cl. .................... 254/323; 414/463; 224/42.23; 224/42.24; 224/42.25
(58) Field of Search .......................... 254/323; 414/463, 414/466; 224/42.21, 42.22, 42.23, 42.24, 42.25

(56) References Cited

U.S. PATENT DOCUMENTS

| | | | | |
|---|---|---|---|---|
| 4,884,785 A | * | 12/1989 | Denman et al. ............ | 254/323 |
| 5,188,341 A | | 2/1993 | Greaves | |
| 5,975,498 A | * | 11/1999 | Sauner ........................ | 254/323 |
| 6,012,707 A | * | 1/2000 | Enlund ........................ | 254/323 |
| 6,092,790 A | * | 7/2000 | Dobmeier et al. .......... | 254/323 |
| 6,267,546 B1 | * | 7/2001 | Oxyer et al. ................ | 254/323 |

* cited by examiner

Primary Examiner—Emmanuel M. Marcelo
(74) Attorney, Agent, or Firm—Porter, Wright, Morris & Arthur

(57) ABSTRACT

A tire carrier assembly for storing a spare tire of a motor vehicle includes a tire carrier adapted for supporting the spare tire, a winch assembly operably connected to the tire carrier to raise and lower the tire carrier between a stowed position wherein the tire is inaccessible and a deployed position wherein the tire is accessible, and a latch assembly. The latch assembly includes at least one latch member and an actuator adapted to selectively move the latch member between a locking position wherein the latch member prevents movement of the tire carrier from the stowed position to the deployed position and an unlocking position wherein the latch member permits movement of the tire carrier from the stowed position to the deployed position. The actuator includes a push-pull cable and a pull handle such that the operator manually pulls the cable to move the latch member from the locking position to the unlocking position. In one embodiment, a single latch member moves along a linear path while in other disclosed embodiments a pair of hooks pivot in opposite directions. Other embodiments are disclosed having actuators which automatically pivot a pair of hooks between the locking and unlocking positions.

20 Claims, 11 Drawing Sheets

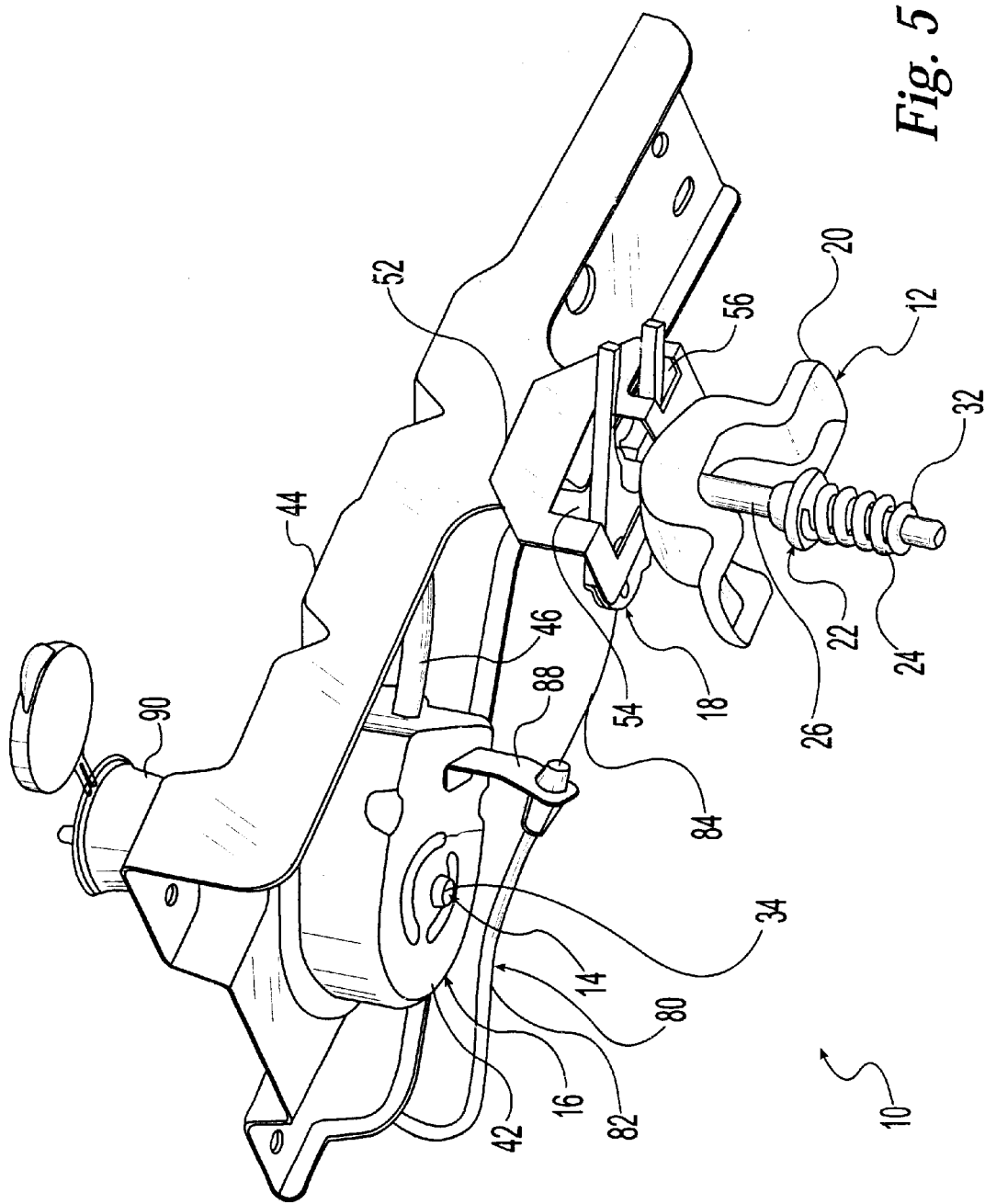

SECONDARY LATCH FOR A TIRE CARRIER

FIELD OF THE INVENTION

The present invention generally relates to a tire carrier for a vehicle and, more particularly, to a secondary latch for maintaining the tire carrier in a stowed position.

BACKGROUND OF THE INVENTION

Vehicles with inflatable tires such as passenger cars, light and heavy duty trucks, tractor trailers, buses, commercial delivery vehicles, among other motorized forms of transportation and trailers pulled by such vehicles are conventionally equipped with spare tires. Some spare tires are stored under the vehicle using a tire carrier which includes a tire winch for raising and lowering the spare tire between a raised or stored position and a lowered or accessed position. The winch typically raises and lowers the spare tire using a flexible member such as a cable or cord which is wound and unwound on a spool or reel. A secondary latch is often provided to secure the spare tire in the stored position. If the flexible member or winch fails while the spare tire is in the stored position, the secondary latch ensures that the spare tire remains in the stored position.

For example, U.S. Pat. No. 5,188,341, the disclosure of which is expressly incorporated herein in its entirety, discloses a secondary latch for a tire carrier. The secondary latch includes a latch member which is pivotably mounted to swing a pair of arcuate fingers between a locked position and an unlocked position. The lock member is biased to the locked position by gravity. The lock member is selectively pivoted to the unlocked position by a lever which is activated by a cranking member when engaging the winch.

While these secondary latches may effectively retain the spare tire in the stored position under some conditions, they have numerous shortcomings. For example, loads are transmitted through a relatively small contact area, a relatively large number of parts are required, they are relatively difficult to assemble, and relatively large number of high tolerance components are required. Additionally, the operator is unaware of the secondary latch and whether or not it is working properly. Accordingly, there is a need in the art for a secondary latch which the operator is aware of, the operator can determine if it is functioning properly, has improved load distribution, has reduced weight, has ease of assembly, and has a reduced number of total parts and high tolerance parts.

SUMMARY OF THE INVENTION

The present invention provides a latch mechanism for a vehicle which overcomes at least some of the above-noted problems of the related art. According to the present invention, a tire carrier assembly comprises, in combination, a tire carrier adapted for supporting the spare tire, a winch assembly operably connected to the tire carrier to raise and lower the tire carrier between a stowed position wherein the tire is inaccessible and a deployed position wherein the tire is accessible, and a latch assembly. The latch assembly including at least one latch member and an actuator adapted to selectively move the latch member between a locking position wherein the latch member prevents movement of the tire carrier from the stowed position to the deployed position and an unlocking position wherein the latch member permits movement of the tire carrier from the stowed position to the deployed position. The actuator includes a control member visible to the operator. In a preferred embodiment of the present invention, the actuator includes a push-pull cable and the control member is a pull handle connected to the push-pull cable.

According to another aspect of the present invention, a tire carrier assembly for storing a spare tire on a motor vehicle comprises, in combination, a tire carrier adapted for supporting the spare tire, a winch assembly operably connected to the tire carrier to raise and lower the tire carrier between a stowed position wherein the tire is inaccessible and a deployed position wherein the tire is accessible, and a latch assembly. The latch assembly includes a pair of hooks and an actuator adapted to selectively move the hooks between locking and unlocking positions. The hooks are pivotable between the locking position wherein the hooks are engageable with the tire carrier to prevent movement of the tire carrier from the stowed position to the deployed position and the unlocking position wherein the hooks are not engageable with the tire carrier to permit movement of the tire carrier from the stowed position to the deployed position. Various preferred embodiments are disclosed wherein the hooks are biased to either the unlocking position or the locking position and the actuator either automatically moves the hooks or manually moves the hooks.

From the foregoing disclosure and the following more detailed description of various preferred embodiments it will be apparent to those skilled in the art that the present invention provides a significant advance in the technology and art of latching mechanisms. Particularly significant in this regard is the potential the invention affords for providing a light weight, high quality, feature-rich, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 4 is a plan view of a slider or lock member of the tire carrier of FIGS. 1 to 3;

FIG. 5 is another perspective view of the tire carrier of FIGS. 1 to 3 generally showing an opposite side of the tire carrier;

Figure 1:
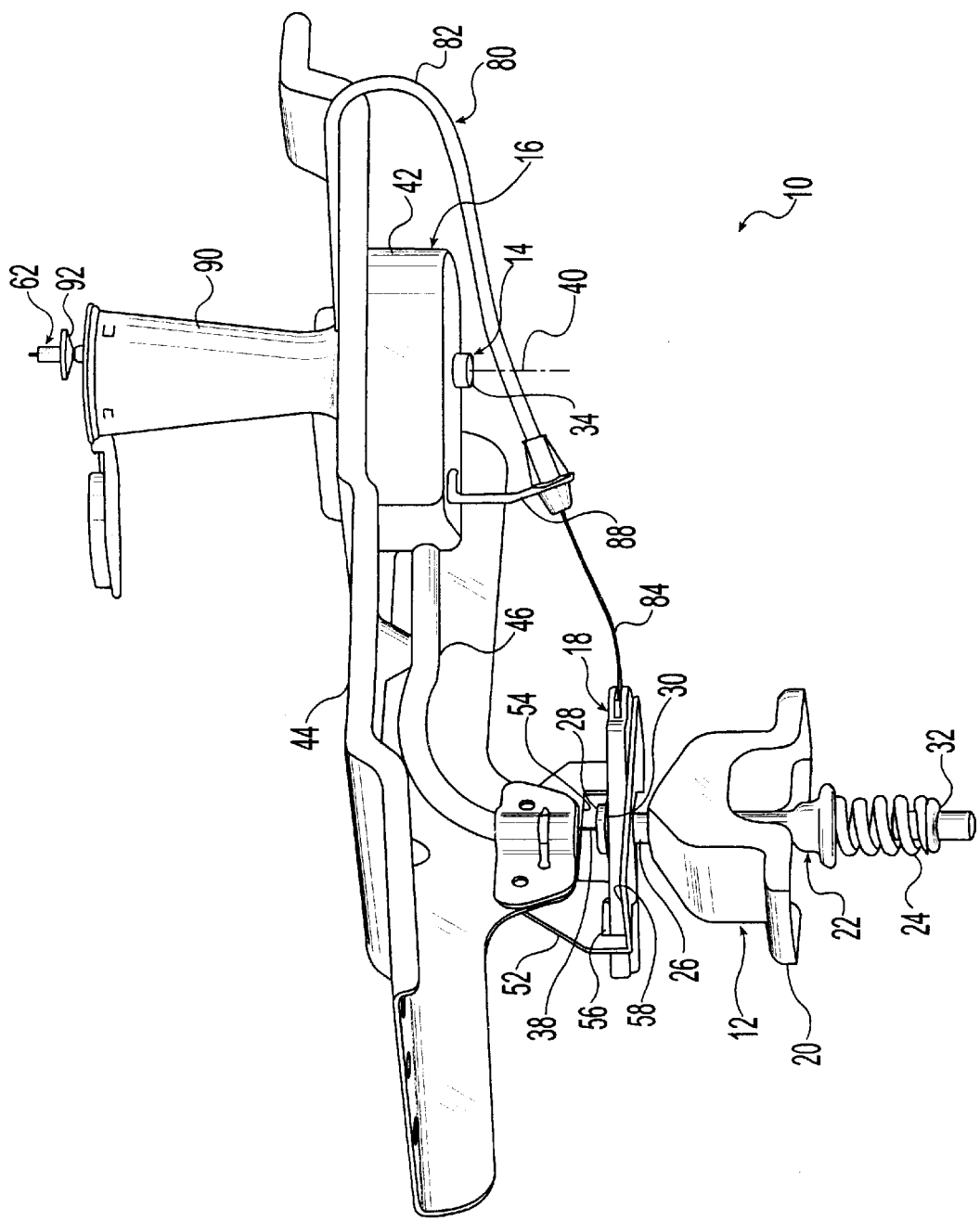
FIG. 1 is an elevation view of a tire carrier having a secondary latch according to a first embodiment of the present invention wherein the secondary latch is in a locked position.
Figure 2:
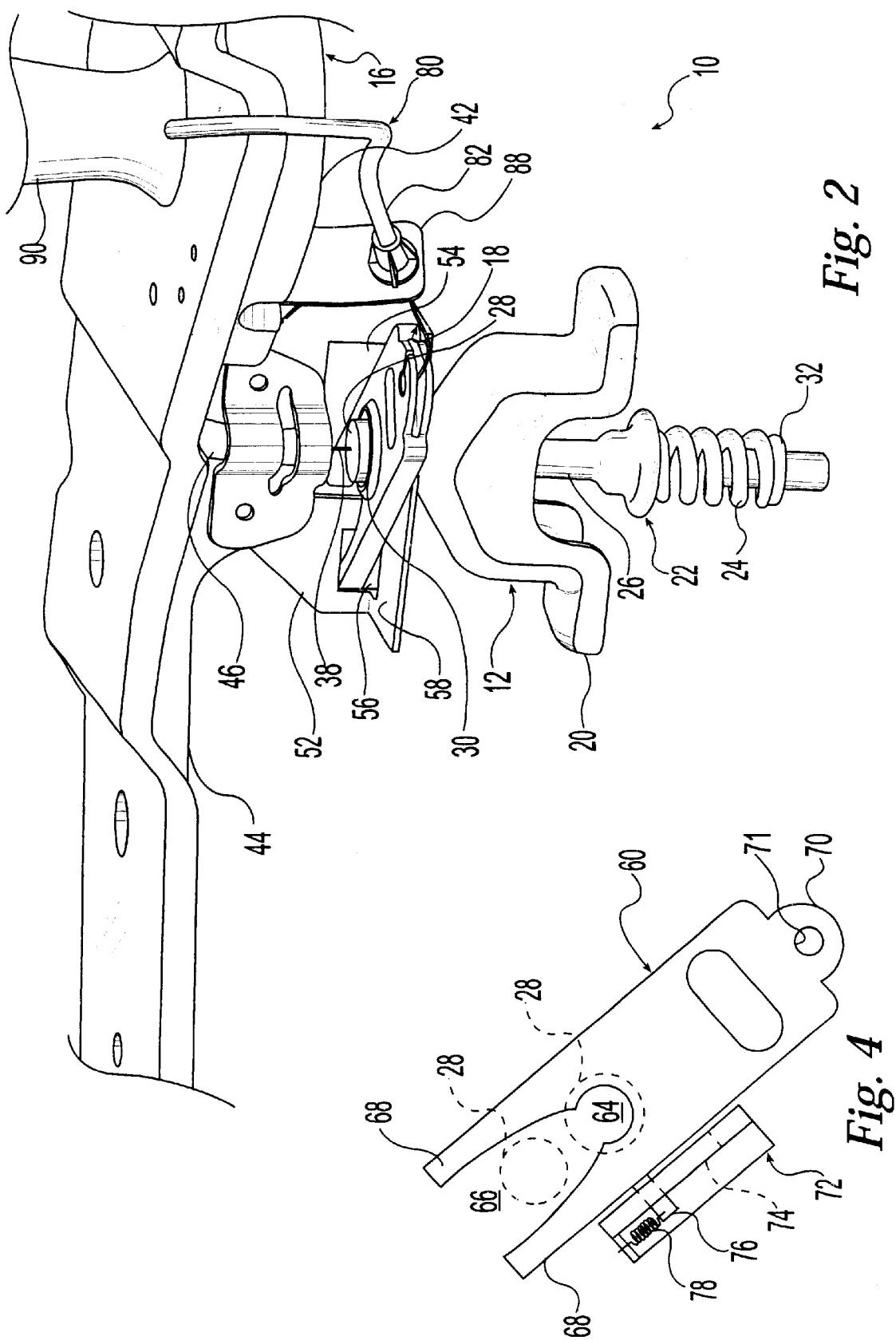
FIG. 2 is an enlarged perspective view of the tire carrier of FIG. 1 showing a lock member.
Figure 3:
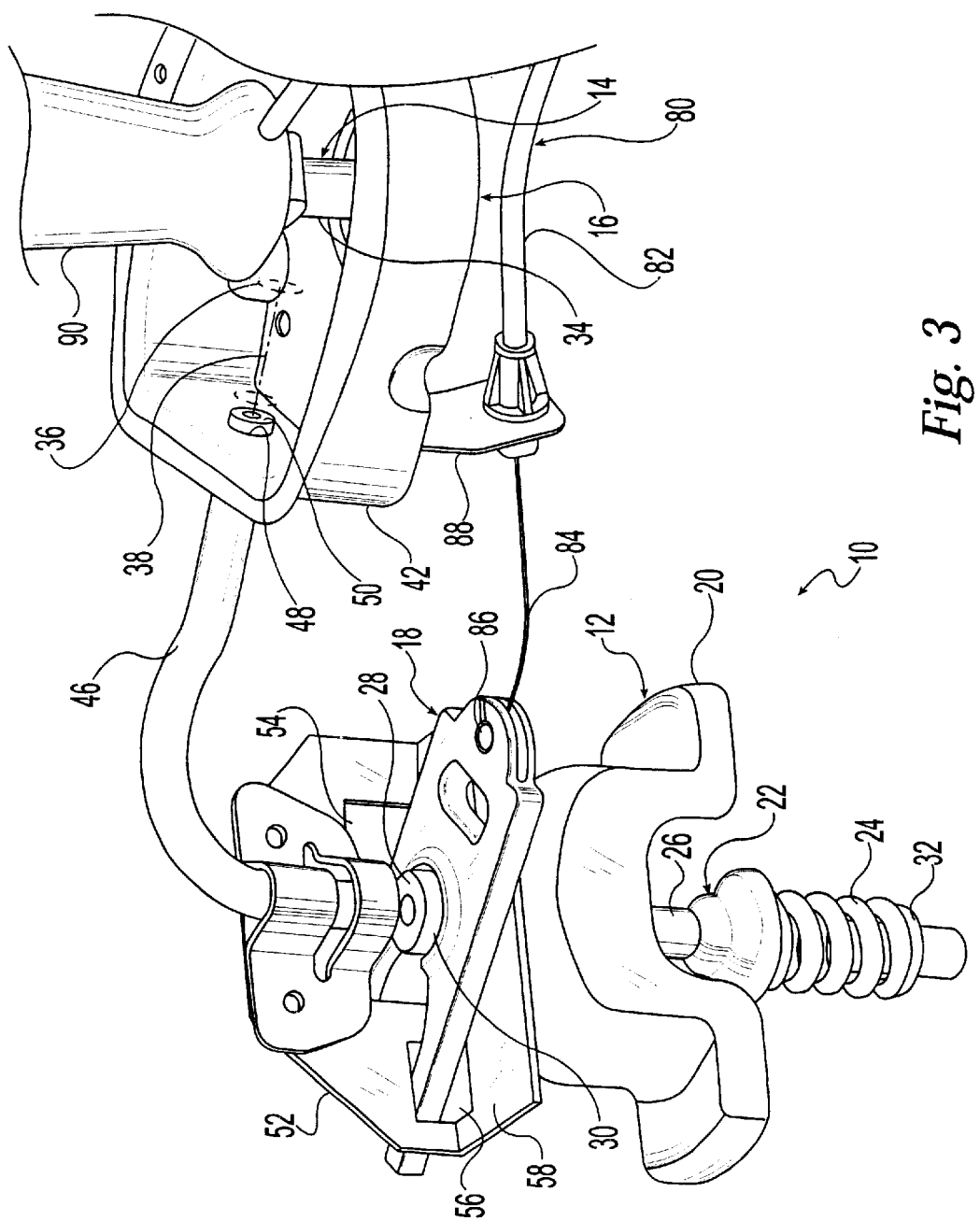
FIG. 3 is a perspective view similar to FIG. 2 but with components removed for clarity.
Figure 6:
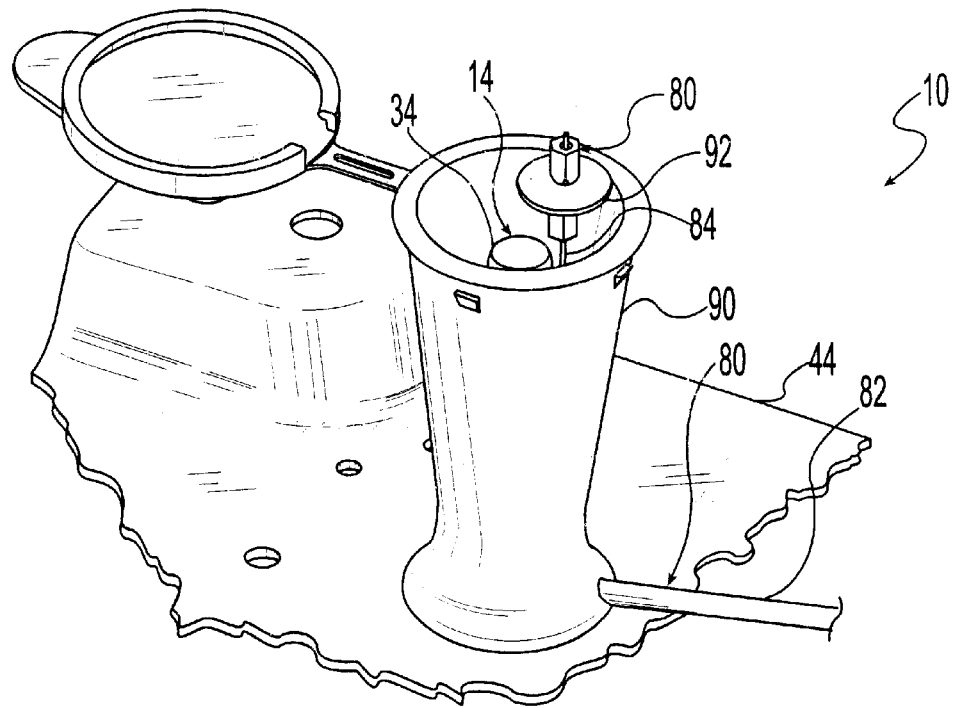
FIG. 6 is an enlarged perspective view the tire carrier of FIGS. 1–5 in the area of a drive shaft access housing.
Figure 7:
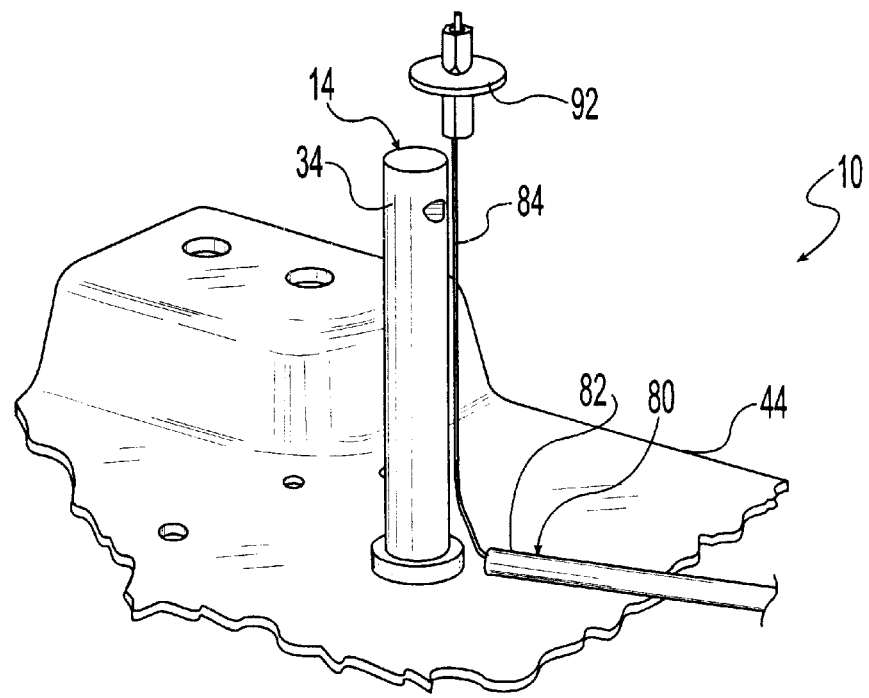
FIG. 7 is a perspective view of the tire carrier similar to FIG. 6 but with the access housing removed for clarity.

It should be understood that the appended drawings are not necessarily to scale, presenting a somewhat simplified representation of various preferred features illustrative of the basic principles of the invention. The specific design features of a latching mechanism as disclosed herein, including, for example, specific shapes of the lock member or actuator will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tire carrier illustrated in the drawings. In general, up or upward refers to an upward direction in the plane of the paper in FIGS. 1, 10 and 14 and down or downward refers to a downward direction in the plane of the paper in FIGS. 1, 10 and 14.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved secondary latch for a tire carrier disclosed herein. The following detailed discussion of various alternative and preferred embodiments will illustrate the general principles of the invention with reference to a tire carrier for use with a motor vehicle. Other embodiments suitable for other applications will be apparent to those skilled in the art given the benefit of this disclosure.

Referring now to the drawings, FIGS. 1 to 7 illustrate a tire carrier assembly 10 for a spare tire of a motor vehicle, such as a van or truck, according to the present invention. While the illustrated embodiments of the present invention are particularly adapted for use with a van or truck it is noted that the present invention can be utilized with any motor vehicle having inflated tires such as automobiles, recreational vehicles, off road vehicles such as dune buggies, and the like.

The tire carrier assembly 10 includes a tire carrier 12 for carrying and supporting a spare tire thereon, a winch assembly 14 for raising and lowering the tire carrier 12 between an upper or storing position and a lower or accessing position, a housing assembly 16 for at least partially housing the winch assembly 14 and mounting the various components to the motor vehicle, and a secondary latch assembly 18 for securing or confining the tire carrier 12 in the storing position.

The tire carrier 12 includes a tire plate 20, a swivel 22, and a spring member 24. The tire plate is adapted for supporting the spare tire in a horizontal position. It is noted that the tire plate 20 can have many different forms. The swivel 22 vertically extends through the tire plate 20 and includes shank portion 26 which extends above the tire plate 20 and a head portion 28 at an upper end of the shank portion 26 which forms a downward facing shoulder or abutment 30. The illustrated abutment 30 is substantially planer and annular-shaped. The spring member 24 biases the tire plate 20 in an upward direction to retain tension in the assembly as is known in the art. The illustrated spring member 24 is a coil compression spring acting between a flange of an end fitting 32 and the lower side of the swivel 22.

The winch assembly 12 includes a shaft 34, a spool or reel 36 rotatable with the shaft 34, and a flexible member 38 such as a cable, rope or cord which is wound onto and off of the reel 36. The shaft 34 of the illustrated embodiment is substantially vertical and extends upwardly and downwardly from the housing assembly 16. The shaft 34 is mounted for rotation about its central axis 40. The reel 36 is mounted for rotation with the shaft 34 and is adapted to wind and unwind the flexible member 38 thereon upon rotation of the shaft 34. It is noted that suitable torque limiters, gear reduction devices and the like can be provided in a known manner. It is noted that any suitable winch assembly known in the art can be utilized within the scope of the present invention. The flexible member 38 has a first or upper end secured to the reel 36 and a second or lower end extending through the swivel 22 to the end fitting 32 such that the tire plate 20 is raised and lowered as the flexible member 38 is wound and unwound on the reel 36 respectively.

The housing assembly 16 includes a housing 42, a cover or support plate 44, and a guide 46. The housing 42 is generally shaped and sized to enclose the winch assembly 14 within a hollow interior space. The housing 42 has an open upper side for insertion of the winch assembly 42 and an opening on a generally closed lower side opposite the open side for passage of the winch shaft 34 therethrough. The housing 42 also has an opening 48 at its side wall for passage of the flexible member 38 from the reel 36 to the swivel 22. The illustrated cover plate 44 is generally planar and is adapted to generally close the open side of the housing 42 when secured thereto and to secure the tire carrier assembly 10 to the motor vehicle. The cover plate 44 has a flange which extends downwardly below the housing 42 to cooperate with and support the guide 46 as described in more detail herein below. The guide 46 is adapted for turning the flexible member 38 about ninety degrees from horizontal at the housing 42 to vertical at the swivel 22. The guide 46 extends from the opening 48 at the generally closed side of the housing 42 to the down turned flange of the cover plate 44. The guide 46 forms a conduit 50 for passage of the flexible member 38 therethrough. The guide 46 is supported by and secured to the down turned flange of the cover plate 44 in any suitable manner such as, for example, bolts, rivets, or other suitable fasteners.

Also provided is a mounting bracket 52 which forms a pair of horizontally spaced apart pair of openings 54, 56. The mounting bracket 52 also has a horizontally extending flange adjacent a lower edge of the openings 54, 56 which forms a generally horizontal support surface 58 for the secondary latch assembly 18 as described in more detail hereinbelow. The mounting bracket 52 is supported by and secured to the down turned flange of the cover plate 44 in any suitable manner such as, for example, bolts, rivets, or other suitable fasteners. In the illustrated embodiment, common fasteners are utilized to secure both the guide 46 and the mounting bracket 52 to the cover plate 44.

The secondary latch assembly 18 includes a slider or latch member 60 and an actuator moving the latch member 60 between a latching position wherein the tire carrier 12 is retained in the storing position and an unlatching position wherein the tire carrier 12 is free to change positions. The illustrated latch member 60 is a generally planer member having a first or locking opening 64 formed therein which is sized and shaped for passage of the shank portion 26 but not the head portion 28 of the swivel 22 vertically therethrough and a second or unlocking opening 66 formed therein which is sized and shaped for passage of both the shank and head portions 26, 28 of the swivel 22 vertically therethrough. The openings 64, 66 open into each other such that the shank portion 26 of the swivel 22 can horizontally pass from one of the openings 64, 66 to the other of the openings 64, 66 as the latch member 60 is horizontally translated. The illustrated locking opening 66 opens to an end of the latch member 60 to form a pair of laterally spaced apart fingers 68 adapted to extend into the openings 54, 56 in the lower end of the mounting bracket 52. The illustrated latch member 60 is provided with a pair of parallel and vertically spaced apart flanges 70 at the end of the latch member 60 opposite the fingers 68. The flanges 70 are adapted to cooperate with the actuator 62 as described in more detail hereinbelow. The illustrated flanges are each provided with an opening 71 for receiving a pin of the actuator 62. The lower surface of the latch member 60 is preferably substantially planar to cooperate with the generally planar support surface 58 formed by the mounting bracket 52. The upper surface of the latch member 60 is preferably planar about the openings 64, 66 to cooperate with the generally planar abutment 30 formed by the swivel head portion 28.

The fingers 68 of the latch member 60 horizontally extend through the openings 54, 56 in the mounting bracket 52 with the shank 26 and/or the flexible member 38 passing through one of the openings 64, 66. Note that the generally planar lower surface of the latch member 60 rests on the horizontal support surface 58 formed by the mounting bracket 52. Supported in this manner, the latch member 60 is free to slide on the support surface 58 along a horizontal linear path such that a desirable one of the openings 64, 66 is positioned at the swivel 22 and/or flexible member 38.

The illustrated secondary latch 18 includes a guide member 72 (FIG. 4) which is secured to the mounting bracket 52 in any suitable manner. The guide member 72 is adapted to guide movement of the latch member 60 in a substantially linear path. The guide member 72 is provided with a slot 74 which cooperates with a pin 76 laterally extending from the latch member 60. The slot 74 preferably forms abutments at its ends which limit movement of the latch member 60. A spring member 78 is provided which acts between the guide member 72 and the latch member pin 76 to bias the latch member 60 toward the locking position. It is noted that many alternative guide means an/or biasing means can be utilized which are apparent to those skilled in the art.

The illustrated actuator 62 includes a push-pull or Bowden cable 80 which includes a conduit or sheath 82 and a wire or core 84 which is longitudinally movable within the sheath 82. A first end of the cable 80 is operably connected to the latch member 60 while the second end of the cable 80 is operably connected to a control member such as a pull handle or a push button. The core 84 of the first end of the cable 80 is secured to the latch member 60 by the pin 86 extending in the openings 71 of the latch member flanges 70. The sheath 82 at the first end of the cable 80 is secured against movement by a mounting bracket 88. The illustrated mounting bracket 88 is secured to and downwardly extends from the housing 42. The mounting bracket 88 fixes the position of the first end of the sheath 82 so that the core 84 can be moved relative thereto. The cable 80 of the illustrated embodiment extends around the edge of the cover plate 44 and up through a tool access housing 90 containing an upper end of the drive shaft 34. The sheath 82 at the second end of the cable 80 is secured against movement at the base of the access housing 90. The core 84 at the second end of the cable 80 vertically extends through the access housing 90 and is provided with a control member or operator interface such as the illustrated pull handle 92. It is noted that alternative operator interface means and/or locations for the operator interface means can be utilized which are apparent to those skilled in the art. It is noted that the actuator 62 is connected to the latch member 60 without a rigid connection such that the actuator 62 linearly translates the latch member 60 along the support surface 58. It should be appreciated from the above description that the latch member 60 is "free floating", that is, it is free of rigid connections such that it is free to move in at least a vertical direction and preferably in a longitudinal and/or lateral direction.

During normal operation of the motor vehicle, the tire carrier assembly 10 secures the spare tire in the storing position as best shown in FIG. 1. In this storing position, the head portion 28 of the swivel 22 is located with the shank portion 26 of the swivel 22 passing through the latch member 60. The latch member 60 is in the locking position such that the shank portion 26 of the swivel 22 is passing through the locking opening 64 of the latch member 60. The spring member 78 biases the latch member 60 to the locking position such that the latch member 60 is held and maintained in its locking position. In the event of a failure of the winch assembly 14 such as a breakage of the flexible member 38, the tire carrier 12 is maintained or confined in the storing position because the head portion 28 of the swivel 22 can not pass through the locking opening 64 of the latch member 60 because the abutment 30 engages the latch member 60 about the opening 64.

When it is desired to lower the tire carrier 12 from the storing position to the accessing position, the operator gains access to the top of the access housing 90 and pulls the handle 92 which pulls the core 84 of the cable 80 and the latch member 60 secured thereto. As the core 84 is pulled, the first end of the core 84 linearly moves the latch member 60 from the locking position to the unlocking position such that the shank 26 of the swivel 22 passes from the locking opening 64 to the unlocking opening 66. With the shank 26 passing through the unlocking opening 66, the head portion 28 of the swivel 22 is free to pass through the latch member 60 as the operator engages the drive shaft 34 with a tool and rotates the shaft 34. Rotation of the shaft 34 unwinds the flexible member 38 from the reel 36. When the handle 92 is released, the spring member 78 returns the latch member 60 to its locking position.

It should be appreciated from the above noted description that the secondary latch assembly 10 of the present invention provides improved load distribution due to the planar engagement surfaces of the latch member 60, reduced weight due to the ability to utilize a relatively large number of plastic parts, a relatively small number of total parts, improved ease of assembly due to the reduced number of parts and free floating latch member 60, a relatively low number of high tolerance parts due to the free floating latch member 60, and improved reliability due to the spring bias of the actuator 62 and increased use of corrosion resistant materials. The secondary latch assembly 10 also provides a visible disengagement mechanism for the secondary latch assembly 18 so that the operator is aware of the secondary latch, the operator can feel that the secondary latch is functioning properly, the operator can feel safer, and the secondary latch can be actuated from any desirable location such as within the motor vehicle.

FIGS. 8 to 11 illustrate a tire carrier assembly 100 for a spare tire of a motor vehicle, such as a van or truck, according to a second embodiment of the present invention wherein like reference numbers are used to identify like structure. The tire carrier assembly 100 includes a tire carrier 12 for carrying and supporting a spare tire thereon, a winch assembly 14 for raising and lowering the tire carrier 12 between an upper or storing position and a lower or accessing position, a housing assembly (not specifically shown) for at least partially housing the winch assembly 14 and mounting the various components to the motor vehicle, and a secondary latch 18 for securing or confining the tire carrier 12 in the storing position.

The tire carrier 12 includes a tire plate 20, an end fitting 102, and a spring member 24. The tire plate 20 is adapted for supporting the spare tire in a horizontal position. It is noted that the tire plate 20 can have many different forms. The illustrated tire plate 20 forms a generally hollow interior space 104. The top of the tire plate 20 is provided with an opening 106 encircled by a inwardly directed flange 108 which forms a downwardly facing, annularly-shaped abutment 110 within the interior space 104. The bottom of the tire plate 20 is provided with an opening 112 coaxial and opposite the opening 106 at the top of the tire plate 20. The end fitting 102 vertically extends through bottom opening 112 and into the interior space 104. The spring member 24 biases the tire plate 20 in an upward direction to retain tension in the assembly 100 as is known in the art. The illustrated spring member 24 is a coil compression spring acting between a flange of the end fitting 102 and the lower side of the tire plate 20.

The winch assembly 12 can be of any suitable configuration such as, for example, that described in detail hereinabove with reference to the first embodiment of the present invention. The flexible member 38 of the winch assembly 12 has a second or lower end extending through the secondary latch 18 and the upper opening 106 of the tire plate 20 to the end fitting 102 such that the tire plate 20 is raised and lowered as the flexible member 38 is wound and unwound respectively. The housing assembly can also be of any suitable configuration such as, for example, that described in detail hereinabove with reference to the first embodiment of the present invention.

The secondary latch 18 includes a mounting bracket 114, a first and second pivotable latching members or hooks 116, 118, and an actuator 62 for moving the hooks 116, 118 between a latching position wherein the tire carrier 12 is retained in the storing position and an unlatching position wherein the tire carrier 12 is free to change positions. The illustrated mounting bracket 114 includes an upper portion 120 sized and shaped for securing and supporting the secondary latch 18 and a lower portion 122 sized and shaped for insertion through the tire carrier upper opening 106 and into the tire carrier interior space 104. The upper end of the mounting bracket upper portion 120 is provided with an upper opening 124 sized and shaped for passage of the flexible member 38 therethrough and the lower end of the mounting bracket lower portion 122 is provided with a lower opening 126 sized and shaped for passage of the tire carrier end fitting 102 therethrough. Lateral sides of the mounting bracket are providing with openings 128 sized and shaped for passage of a portion of the hooks 116, 118 as described in more detail hereinafter.

Figure 11:
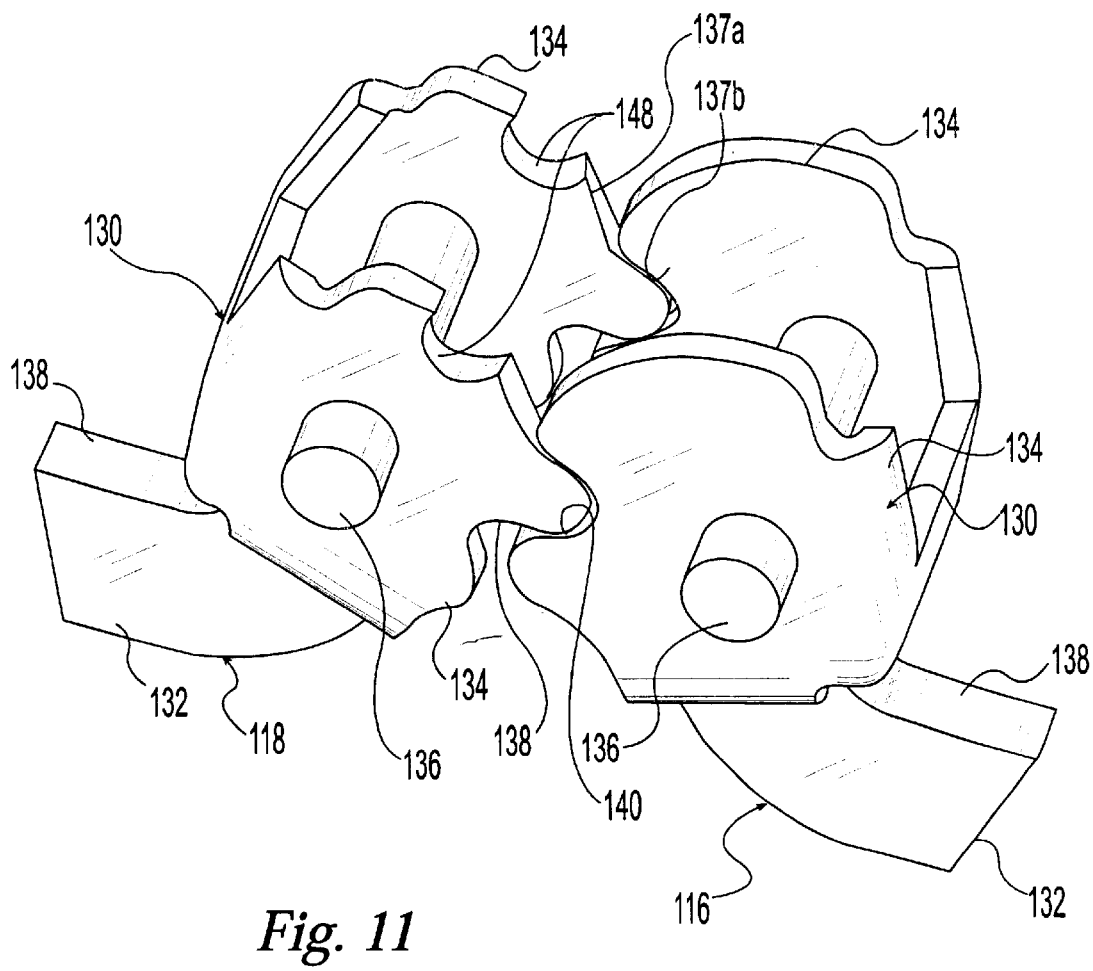
FIG. 11 is a perspective view of a pair of hook members of the secondary latch of FIGS. 8 to 10.

As best shown in FIG. 11, each hook 116, 118 has a mounting portion 130 and an engagement portion 132. The mounting portion 130 includes a pair of spaced apart flanges 134 and an axle or pin extending between and through the flanges 134 such that the pin 136 laterally extends from opposite sides of the mounting portion 130. The mounting portions 130 also are adapted to cooperate such that they pivot in unison in opposite directions. The illustrated hooks 116, 118 are connected by cooperating protrusions 137a and notches 137b on the flanges 134 of the mounting portions 130. It is noted that alternative means for operatively connecting the hooks 116, 118 together to pivot in unison in opposite directions apparent to those skilled in the art can be utilized. It is also noted that the hooks 116, 118 can alternatively be independently pivotable, that is not slaved together. The hook engagement portions 132 are each sized and shaped such that it forms a substantially horizontal and upwardly acing engagement surface 138, when the hook 116, 118 is in a locking position, for cooperating with the tire carrier abutment 110 to prevent passage of the secondary lock 18 through the tire carrier upper opening 106. The hook engagement portions 132 are also sized and shaped to pass through the tire carrier upper opening 106 when the hooks 116, 118 are in the unlocking position.

The pins 136 of the hooks 16, 118 extend through openings in the mounting bracket lower portion 122 to pivotably mount the hooks 116, 118 on horizontal, spaced apart and parallel pivot axes. The hooks 116, 118 are positioned such that the engagement portions 132 extend through the openings 128 in the mounting bracket lower portion 122 in opposite directions when the hooks 116, 118 are in the locking position and are within the mounting bracket lower portion 122 when in the unlocking position. The flexible member 38 vertically passes through the mounting bracket upper opening 124 and between the hooks 116, 118 to the end fitting 102 which extends through the mounting bracket lower opening 126 in the stowed position. It is noted that the flanges 134 of the hook mounting portions 130 form an opening for passage of the flexible member 38 therethrough.

The illustrated actuator 62 includes at least one spring member 140, a camming member 142, and a lock pin 144. The spring member 140 is adapted to bias the hooks 116, 118 toward the unlocking position, that is, bias the engagement portions 132 of the hooks 116, 118 into the lower portion 122 of the secondary latch mounting bracket 114. The illustrated spring member 140 is a torsion spring located at one of the hook pins 136 but other suitable spring members can be utilized. It is noted that if the hooks 116, 118 are not slaved together, each of the hooks 116, 118 should be provided with suitable biasing force.

The camming member 142 is preferably carried by the tire carrier 12 and is sized and shaped to hold the hooks 116, 118 in the locking position against the bias of the spring member 140 when the tire carrier 12 is in the stowed position. In the illustrated embodiment, the camming member 142 is provided at the upper end of the end fitting 102 and is sized and shaped to cooperated with inner surfaces of the hooks 116, 118 to outwardly pivot the hooks 116, 118 to the locking position as the camming member upwardly moves between the hooks 116, 118. It is noted that alternative camming members 142 known to those in the art can be utilized.

The lock pin 144 is supported in spaced-apart arcuate slots 146 formed in opposite sides of the mounting bracket lower portion 122 above the hooks 116, 118. The lock pin 144 is movable between an unblocking position wherein the hooks 116, 118 are freely pivotable and a blocking position wherein the lock pin 144 prevents pivotable movement of the hooks 116, 118. In the illustrated embodiment, the arcuate slots 146 guide the lock pin toward notches or recesses 148 formed in the flanges 134 of the second hook 118. With the lock pin 144 located in the slots 146 of the mounting bracket 114 and the notches 148 of the second hook 118, the second hook 118 is prevented from pivoting. The first hook 116 is also prevented from pivotable movement because the hooks 116, 118 are connected together for pivotable movement in unison in opposite directions. The lock pin 144 is biased toward the blocking position with a spring member which can be the same spring member 140 biasing the hooks 116, 118 or a separate spring member 150. The illustrated spring member 150 is a torsion spring but other suitable types of spring members can be utilized.

Figure 10:
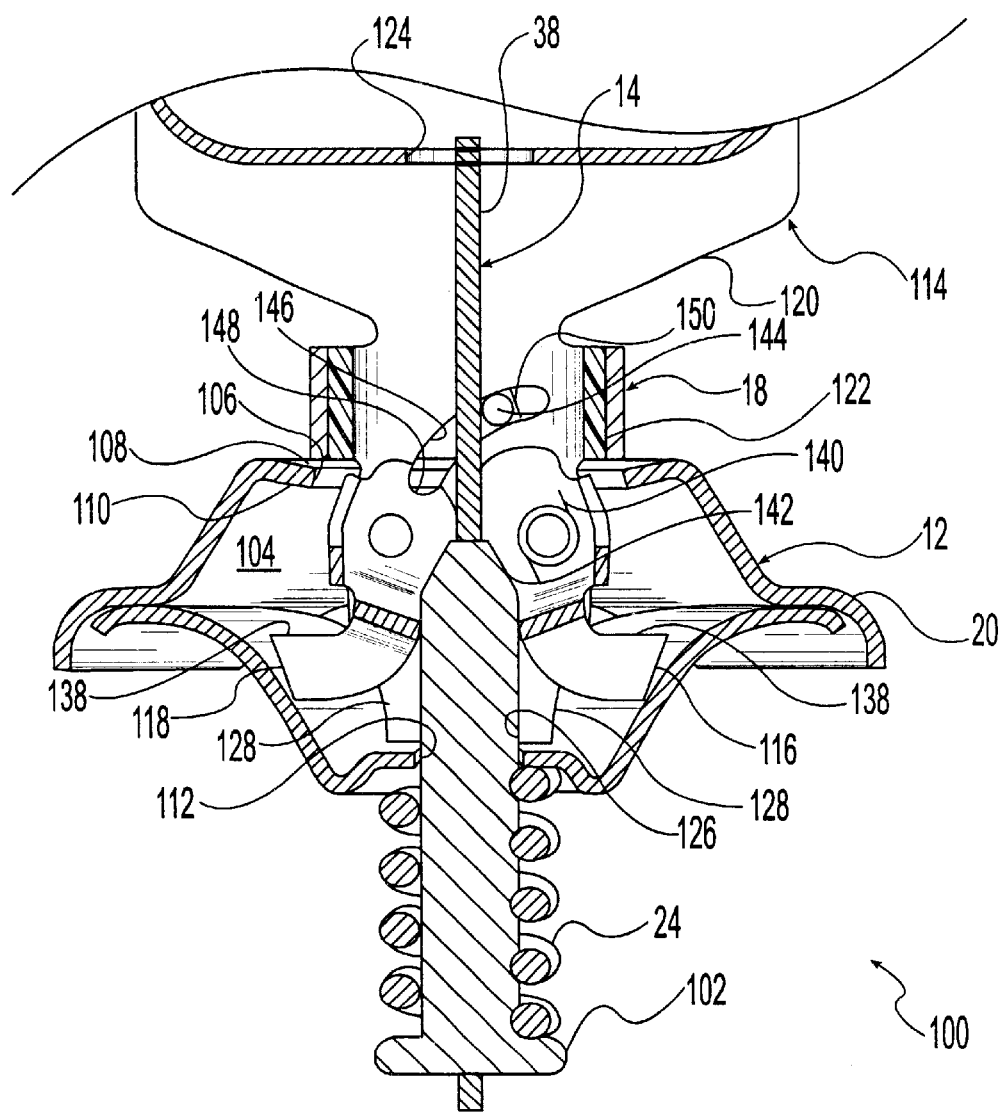
FIG. 10 is an elevational view, in cross section, of the secondary latch of FIG. 9.

As best shown in FIG. 10, the lock pin 144 is located on the opposite side of the flexible member 38 from the notches 148 in the second hook 118 such that the flexible member 38 holds the lock pin in the unblocking position, that is, out of the notches 148. If the flexible member 38 fails, the lock pin 144 moves to the blocking position, that is, into the notches 148 under the bias of the spring member 150.

Figure 8:
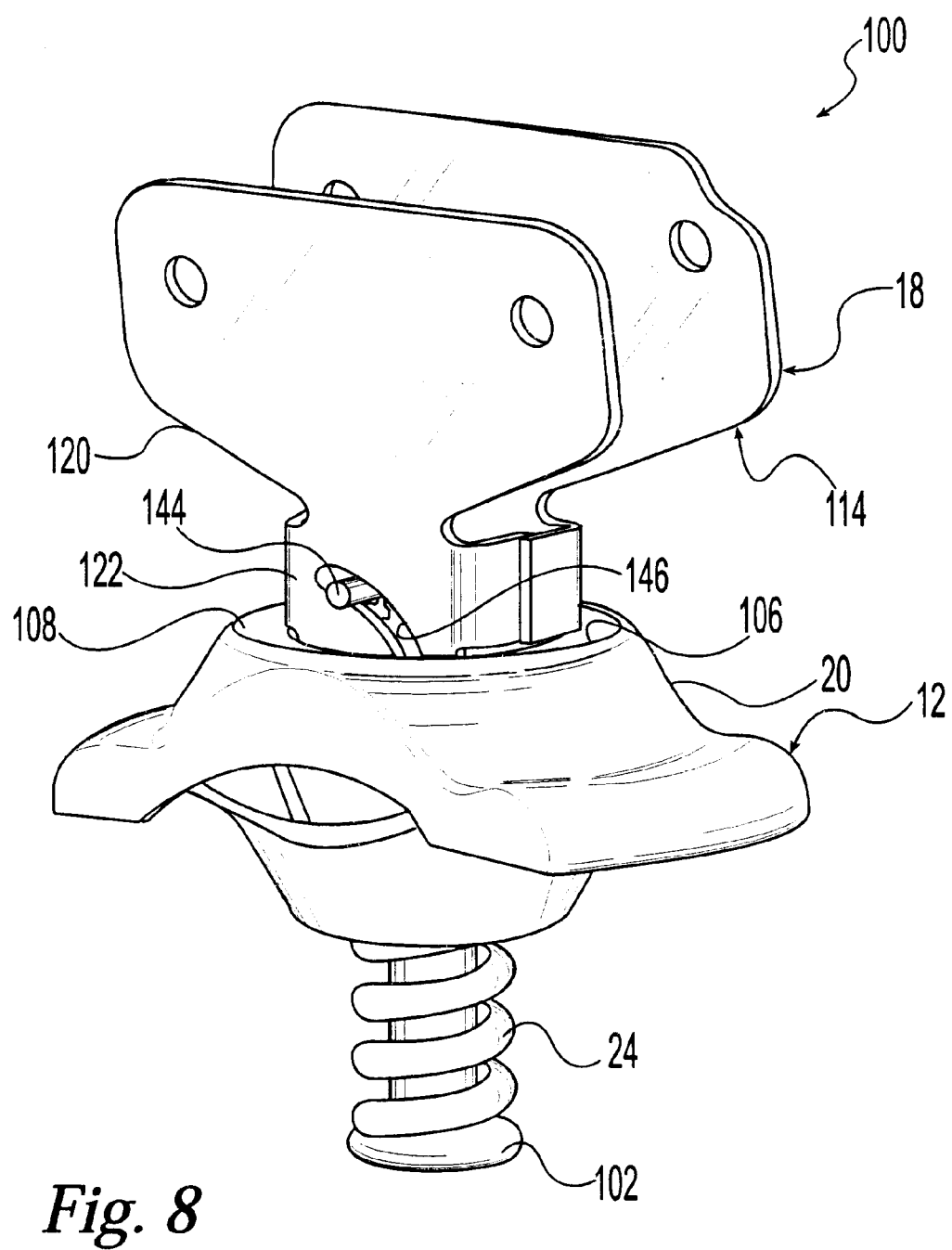
FIG. 8 is a perspective view of a tire carrier having a secondary latch according to a second embodiment of the present invention, wherein the secondary latch is in a locked position and components are removed for clarity.
Figure 9:
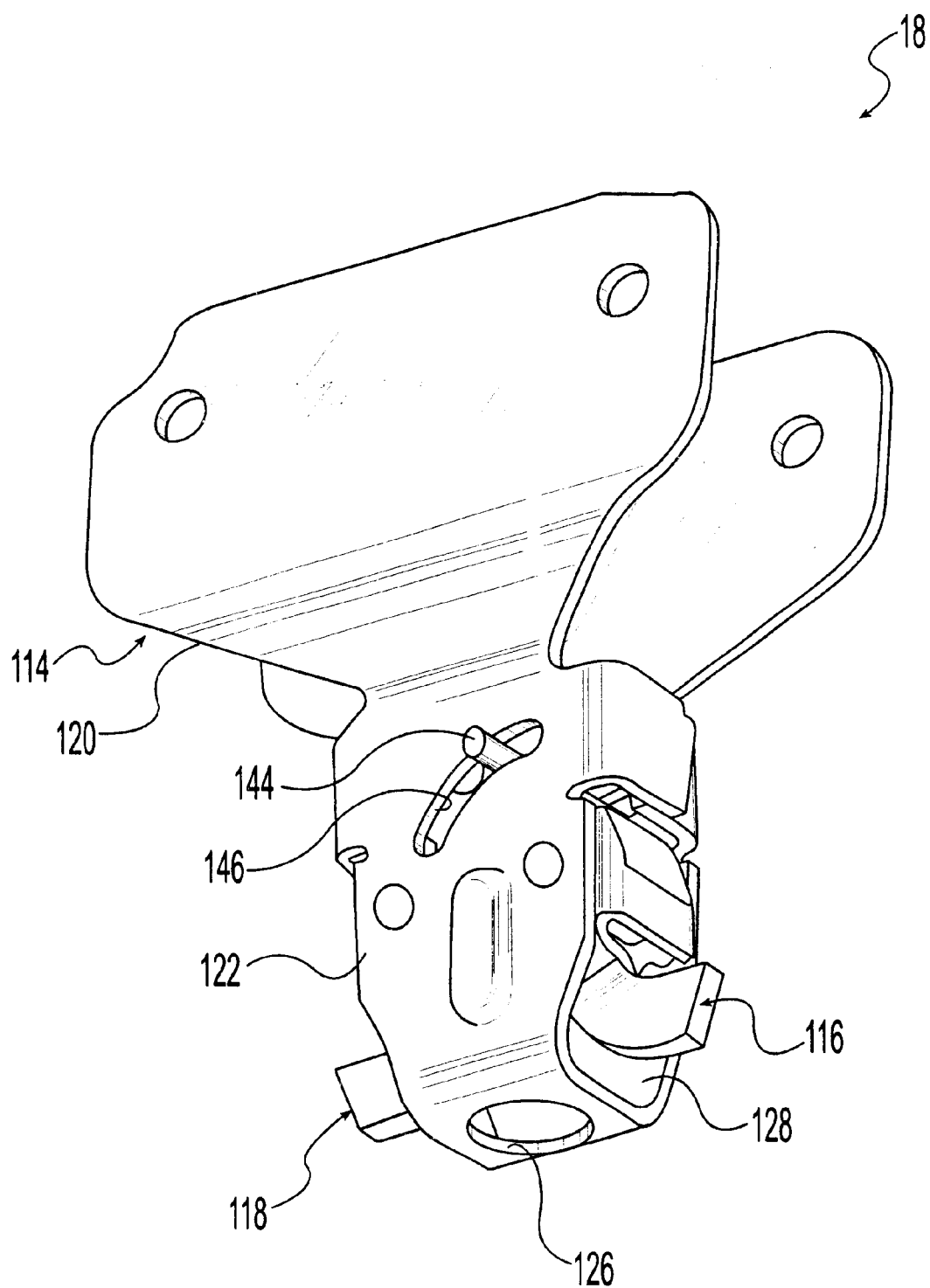
FIG. 9 is a perspective view of the secondary latch of FIG. 8.

During normal operation of the motor vehicle, the tire carrier assembly 10 secures the spare tire in the storing or stowed position as best shown in FIGS. 8 and 10. In this stowed position, the camming member 142 is between the hooks 116, 118 to hold each of the hooks 116, 118 in the locking position. When the flexible member 38 is unreeled to lower the tire carrier, the hooks 116, 118 each automatically pivot to the unlocking position under the bias of the spring member 140 as the end fitting 102 and the camming member 142 move downwardly out from between the hooks 116, 118. With the camming member 142 removed, the hooks 116, 118 are free to pivot because the tensioned flexible member 38 holds the lock pin 144 in the unblocking position. As the tire carrier 12 lowers, through the upper opening 106 of the tire carrier 12 passes over the secondary lock mounting bracket 114, with the hooks 116, 118 located therein. It is noted that the abutment 110 formed by the tire carrier flange 108 is suitably spaced above the hook members 116, 118 in the stored position to permit the camming member 142 to clear the hooks 116, 118 and for the hooks 116, 118 to pivot to the unlocking position before the tire carrier upper opening 106 reaches vertical location of the secondary latch mounting bracket 114 where the hook engagement surfaces 138 are located when in the locking position.

When in the stowed position and the flexible member 38 fails or loses tension, the lock pin 144 is free to move from the unblocking position to the blocking position in the recesses 148 of the second hook 118 under the bias of the spring member 150. If the tire carrier 12 drops due to the failure, it falls until the downwardly facing abutment 110 engages the engagement surfaces 138 of the hooks 116, 118 and the hooks 116, 118 support the tire carrier 12 preventing the tire carrier 12 from lowering any further. The hooks 116, 118 do not pivot because the lock pin 144 is in the blocking position.

It should be appreciated from the above noted description that the secondary latch 18 of the present invention provides improved load distribution due to the planar engagement surfaces of the hooks 116, 118, reduced weight due to the ability to utilize a relatively large number of plastic parts, a relatively small number of total parts, improved ease of assembly due to the reduced number of parts, and improved reliability due to the spring bias of the lock pin and increased use of corrosion resistant materials.

Figure 12:
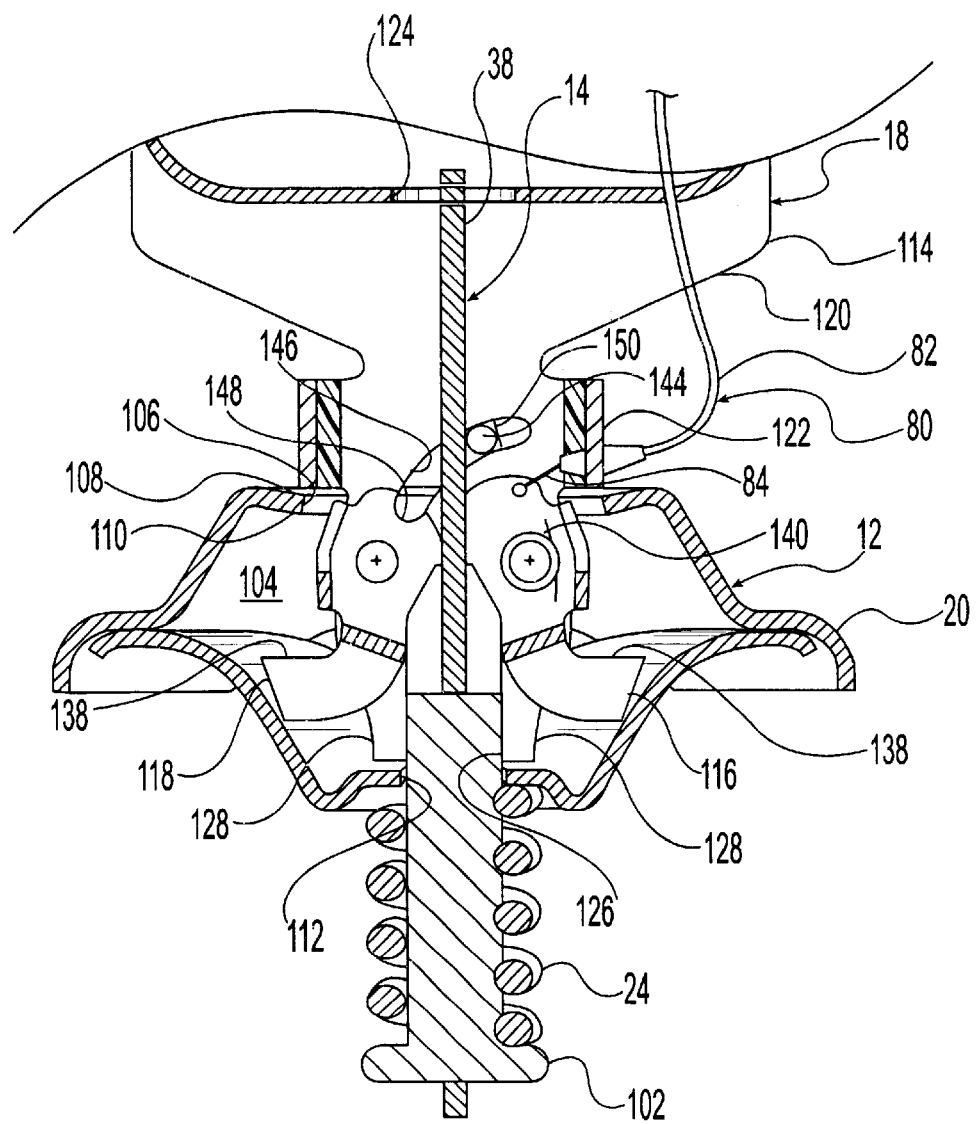
FIG. 12 is an elevational view, in cross section, similar to FIG. 10 but showing and alternative variation of the secondary latch wherein an operator visible, manual actuator is utilized.

FIG. 12 illustrates an alternative variation of the second embodiment described hereinabove wherein like reference numbers are utilized to indicate like structure. The alternative variation is substantially the same as the described hereinabove except the spring member biases the hooks 116, 118 into the locking position and the camming member is replaced with a visible manual actuator. In the illustrated embodiment, the visible manual actuator includes a push-pull or Bowden cable 80 as described in detail hereinabove. A first end of the cable 80 is operably connected to the one of the hooks 116, 118 while the second end of the cable 80 is operably connected to a control member such as a pull handle or a push button. In the illustrated embodiment, the core 84 of the first end of the cable 80 is secured to first hook by a pin. The sheath 82 at the first end of the cable 80 is secured against movement by the mounting bracket 114. The cable 80 of the illustrated embodiment extends upwardly through the mounting bracket to a desired location for operation. It is noted that that the cable 80 can be split and connected to each of the hooks 116, 118, particularly if the hooks 116, 118 are not slaved together.

During normal operation of the motor vehicle, the tire carrier assembly 10 secures the spare tire in the storing or stowed. In this stowed position, the spring member 140 holds each of the hooks 116, 118 in the locking position. To lower the tire carrier 12, the operator manually pulls cable 80 to pivot the hooks 116, 118 to the unlocked position against the bias of the spring member 140. With the hooks 116, 118 in the unlocked position, the operator operates them, winch to lower the tire carrier. As the tire carrier 12 lowers, through the upper opening 106 of the tire carrier 12 passes over the secondary lock mounting bracket 114, with the hooks 116, 118 located therein. When the push-pull cable 80 is released, the hooks 116, 118 return to the locked position under the bias of the spring member 140. Preferably, the lower surfaces of the hooks 116, 18 are provided with cam surface to temporarily, inwardly pivot the hooks 116, 118 when the tire carrier 12 is raised back to the stowed position If the tire carrier 12 drops due to failure of the flexible member 38, the tire carrier 12 falls until the downwardly facing abutment 110 engages the engagement surfaces 138 of the hooks 116, 118 and the hooks 116, 118 support the tire carrier 12 preventing the tire carrier 12 from lowering any further. The hooks 116, 118 do not pivot because they are biased to the locking position by the spring member 140. Additionally, the lock pin 144 is moved to the blocking position. It is noted that the lock pin 144 can be alternatively eliminated from this embodiment if desired.

Figure 13:
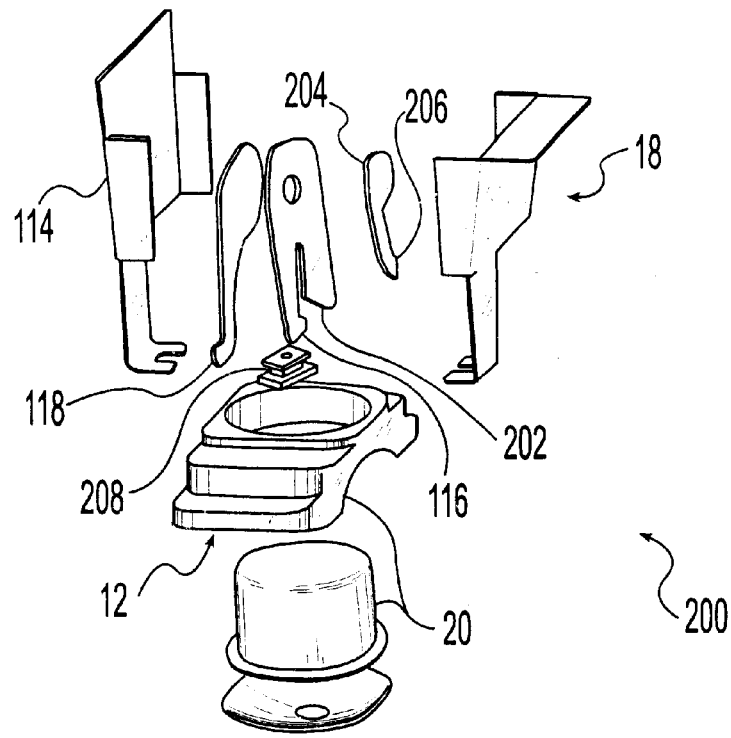
FIG. 13 is a perspective exploded view of a tire carrier having a secondary latch according to a third embodiment of the present invention wherein components of the tire carrier are removed for clarity.
Figure 14:
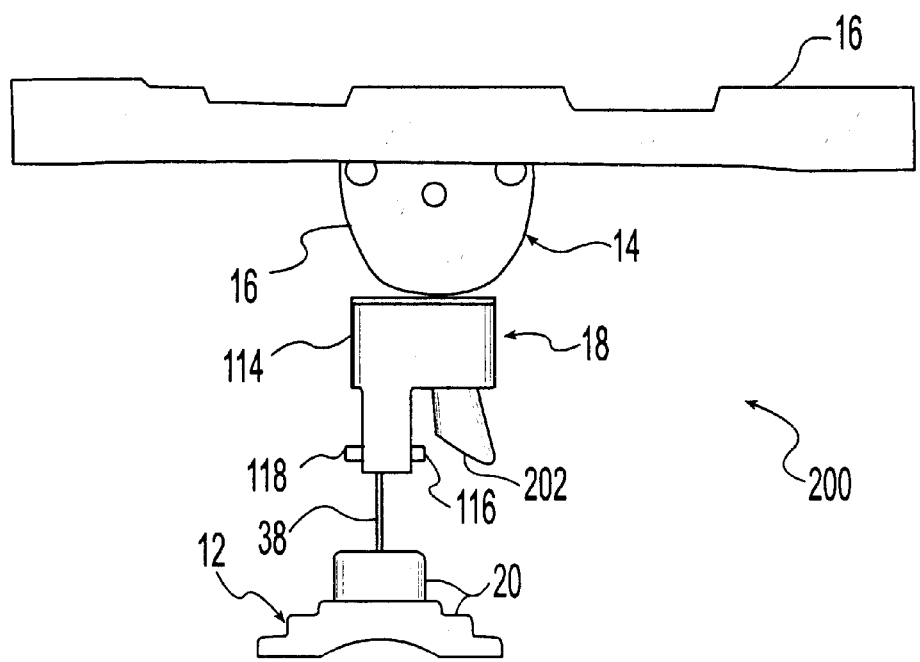
FIG. 14 is an elevational view of the tire carrier of FIG. 13 wherein a wheel plate is in a deployed position.

FIGS. 13 and 14 illustrate a tire carrier assembly 200 for storing a spare tire of a motor vehicle, such as a van or truck, according to a third embodiment of the present invention wherein like reference numbers are used to identify like structure. The tire carrier assembly 200 is similar to the tire carrier 100 according to the second embodiment in that two hooks 116, 118 are provided which are slaved together to move in opposite directions in unison. The first hook 116 is pivotable about a pivot axis while the second hook 118 is connected to the first hook 118 with a pin and slot connection. Preferably each hook 116, 118 is provided with a slot and a pin. The first hook 116 is provided with a first camming surface 202 which moves the hooks 116, 118 into the locking position when engaged by the tire carrier 12 as the tire carrier is raised to the stored position and the tire carrier 12 engages the first camming surface 202 to hold the hooks 116, 118 in the locking position when the tire carrier 12 is in the stored position.

The secondary latch 18 also includes a cam member 204 provided with a second camming surface 206 which engages the flexible member 38 to urge the hooks 116, 118 toward the unlocked position when the tire carrier 12 is lowered and the tire carrier is out of engagement with the camming surface 202 of the first hook. 116. The cam member 204 is operably connected to the first hook 116 and pivotable about the same pivot axis as the first hook 116. As the hooks are moved into the locking position, the cam member 204 moves a portion of the flexible member 38 aside so that it is not completely straight, that is, a "kink" is formed. As the tire carrier 12 is lowered and no longer engages the first camming surface 202 to hold the hooks 116, 118 in the locking position, the pressure of the flexible member 38 engaging the second cam surface 206 moves the hooks 116, 118 to the unlocking position as the tensioned flexible member 38 wants to straighten out.

When the flexible member is not engaging the camming surface 206, such as upon failure of the flexible member 38, the cam member 204 does not urge the hooks 16, 118 toward the unlocked position. Therefore, in the event of failure of the flexible member 38, the hooks 116, 118 remain in the locked position due to the orientation of the slots and the weight applied thereto.

The illustrated mounting bracket 114 includes left and right pieces and includes a plastic guide 208 at the lower opening to protect the flexible member 38 from contact with a metal edge of the mounting bracket.

It should be noted that the each of the features of the various embodiments disclosed in detail hereinabove can be utilized with each of the other disclosed embodiments, such as for example, the third embodiment can be adapted to include a visible, manual actuator including a push-pull cable.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the latch member 60 and the actuator 62 can have many different forms. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A tire carrier assembly for storing a spare tire on a motor vehicle comprising, in combination:
    a tire carrier adapted for supporting the spare tire;
    a winch assembly operably connected to the tire carrier to raise and lower the tire carrier between a stowed position wherein the tire is inaccessible and a deployed position wherein the tire is accessible;
    wherein the winch assembly is manually operated with a tool to raise and lower the tire carrier;
    a latch assembly including at least one latch member and an actuator which selectively moves the latch member between a locking position wherein the latch member prevents movement of the tire carrier from the stowed position to the deployed position and an unlocking position wherein the latch member permits movement of the tire carrier from the stowed position to the deployed position; and
    wherein the actuator includes a control member that is operable to move the latch member from the locking position to the unlocking position separate from movement of the tool used to operate the winch assembly.

2. The tire carrier assembly according to claim 1, wherein the control member is visible to the operator.

3. The tire carrier assembly according to claim 1, wherein the latch member is adapted to move along a linear path between the locking position and the unlocking position.

4. The tire carrier assembly according to claim 1, wherein the latch member is pivotable between the locking position and the unlocking position.

5. A tire carrier assembly for storing a spare tire on a motor vehicle comprising, in combination:
    a tire carrier adapted for supporting the spare tire;
    a winch assembly operably connected to the tire carrier to raise and lower the tire carrier between a stowed position wherein the tire is inaccessible and a deployed position wherein the tire is accessible;
    a latch assembly including at least one latch member and an actuator which selectively moves the latch member between a locking position wherein the latch member prevents movement of the tire carrier from the stowed position to the deployed position and an unlocking position wherein the latch member permits movement of the tire carrier from the stowed position to the deployed position; and
    wherein the actuator includes a push-pull cable having a sheath and a flexible core axially moveable within the sheath and the core has a first end connected to the actuator and a second end connected to a control member so that axial movement of the core within the sheath operates the actuator to move the latch member from the locking position to the unlocking position.

6. The tire carrier assembly according to claim 5, wherein the control member is located within the motor vehicle.

7. The tire carrier assembly according to claim 5, wherein the control member selectively pulls the core.

8. The tire carrier assembly according to claim 7, wherein the control member includes a pull handle to manually pull the core.

9. A tire carrier assembly for storing a spare tire on a motor vehicle comprising, in combination:
    a tire carrier adapted for supporting the spare tire;
    a winch assembly operably connected to the tire carrier to raise and lower the tire carrier between a stowed position wherein the tire is inaccessible and a deployed position wherein the tire is accessible; and
    a latch assembly including a pair of hooks and an actuator that selectively moves the hooks between locking and unlocking positions, the hooks being pivotably mounted so that the hooks are pivotable between the locking position wherein the hooks are engageable with the tire carrier to prevent movement of the tire carrier from the stowed position to the deployed position and the unlocking position wherein the hooks are not engageable with the tire carrier to permit movement of the tire carrier from the stowed position to the deployed position.

10. The tire carrier assembly according to claim 9, wherein the latch assembly further includes at least one spring member biasing the hooks toward the unlocking position.

11. The tire carrier assembly according to claim 10, wherein the tire carrier is adapted to hold the hooks in the locking position when the tire carrier is in the stowed position.

12. The tire carrier assembly according to claim 9, wherein the hooks are operably connected to pivot in unison in opposite directions.

13. The tire carrier assembly according to claim 9, wherein the latch assembly further includes a lock pin movable between a blocking position which prevents pivoting of the hooks from the locking position to the unlocking position and an unblocking position which permits pivoting of the hooks from the locking position to the unlocking position, and wherein the lock pin is held in the unblocking position by a flexible member of the winch assembly which is connected to the tire carrier.

14. The tire carrier assembly according to claim 13, wherein the lock pin is biased toward the blocking position.

15. The tire carrier assembly according to claim 9, wherein the latch assembly further includes at least one spring member biasing the hooks toward the locking position.

16. The tire carrier assembly according to claim 15, wherein the actuator includes a push-pull cable for selectively moving the hooks from the locking position to the unlocking position.

17. The tire carrier assembly according to claim 9, wherein the actuator includes a cam member adapted to urge the hooks toward the unlocking position when engaged by a flexible member of the winch assembly which is connected to the tire carrier.

18. The tire carrier assembly according to claim 17, wherein a camming surface provided by one of the hooks holds the hooks in the locked position when engaged by the tire carrier in the stowed position.

19. The tire carrier assembly according to claim 17, wherein the hooks are operably connected to move in unison generally in opposite directions.

20. The tire carrier assembly according to claim 9, wherein the hooks move in opposite directions when moving from the locking position to the unlocking position.

* * * * *